US012798594B2

(12) United States Patent
Tanaka et al.

(10) Patent No.: US 12,798,594 B2
(45) Date of Patent: Nov. 17, 2026

(54) VEHICLE PLATFORM AND METHOD FOR CONTROLLING VEHICLE PLATFORM

(71) Applicant: TOYOTA JIDOSHA KABUSHIKI KAISHA, Toyota (JP)

(72) Inventors: Go Tanaka, Toyota (JP); Ikuma Suzuki, Okazaki (JP); Taisuke Hayashi, Toyota (JP); Kazuhiro Ozawa, Toyota (JP); Yuji Watari, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/330,575

(22) Filed: Sep. 16, 2025

(65) Prior Publication Data

US 2026/0103207 A1 Apr. 16, 2026

(30) Foreign Application Priority Data

Oct. 10, 2024 (JP) ................................. 2024-177956

(51) Int. Cl.
*B60W 50/032* (2012.01)
*B60R 16/023* (2006.01)
*B60W 50/029* (2012.01)

(52) U.S. Cl.
CPC ....... *B60W 50/032* (2013.01); *B60R 16/0234* (2013.01); *B60W 50/029* (2013.01); *B60W 2050/0292* (2013.01)

(58) Field of Classification Search
None
See application file for complete search history.

(56) References Cited

U.S. PATENT DOCUMENTS

| | | | | |
|---|---|---|---|---|
| 2011/0004386 A1* | 1/2011 | Kinder | B60T 8/885 | 701/70 |
| 2021/0237765 A1* | 8/2021 | Ando | B60W 60/001 | |
| 2021/0245779 A1* | 8/2021 | Suzuki | B60W 50/10 | |
| 2023/0237858 A1* | 7/2023 | Kobayashi | G07C 5/02 | 701/29.3 |
| 2024/0253666 A1 | 8/2024 | Suzuki et al. | | |

FOREIGN PATENT DOCUMENTS

JP 2024-106017 A 8/2024

* cited by examiner

*Primary Examiner* — Justin S Lee
(74) *Attorney, Agent, or Firm* — Oliff PLC

(57) ABSTRACT

At the time of occurrence of a one-system failure, each of VCIBs carries out limp home traveling control including deceleration in accordance with an instruction from an ADK. At the time of occurrence of a two-system failure, in a case where a vehicle speed can be obtained, one of vehicle fixation systems carries out fixation control, when the vehicle speed becomes zero, and in a case where the vehicle speed cannot be obtained, one of the vehicle fixation systems carries out the fixation control after a lapse of a time period S from a time-counting start moment, when the vehicle speed immediately before the occurrence of the two-system failure is less than a prescribed value, and carries out the fixation control after a lapse of a time period T (>S), when the vehicle speed immediately before the occurrence of the two-system failure exceeds the prescribed value.

5 Claims, 5 Drawing Sheets

VEHICLE PLATFORM AND METHOD FOR CONTROLLING VEHICLE PLATFORM

CROSS REFERENCE TO RELATED APPLICATIONS

This nonprovisional application is based on Japanese Patent Application No. 2024-177956 filed on Oct. 10, 2024 with the Japan Patent Office, the entire contents of which are hereby incorporated by reference.

BACKGROUND

Field

The present disclosure relates to a vehicle platform and a method for controlling the vehicle platform, and particularly to a vehicle platform to and from which an autonomous driving kit that gives an instruction for autonomous driving is attachable and detachable, the vehicle platform being configured to be capable of autonomous driving, and a method for controlling the vehicle platform.

Description of the Background Art

There has conventionally been a vehicle platform (hereinafter referred to as "VP") on which an autonomous driving kit (hereinafter referred to as "ADK") is mountable, the VP including a base vehicle and a vehicle control interface box (hereinafter referred to as "VCIB") that interfaces between the base vehicle and an autonomous driving system through a communication bus (refer to, for example, Japanese Patent Laying-Open No. 2024-106017). In the VP, as paths through which signals are exchanged between the ADK and the VP, there are two systems, i.e., a path via a main bus and a main VCIB and a path via a sub bus and a sub VCIB.

SUMMARY

In the VP in Japanese Patent Laying-Open No. 2024-106017, carrying out appropriate fallback control when both of the two paths through which signals are exchanged between the ADK and the VP fail has not been considered.

The present disclosure has been made to solve the above-described problem and an object thereof is to provide a vehicle platform in which appropriate fallback control can be carried out even when a communication path between an autonomous driving kit and the vehicle platform fails, and a method for controlling the vehicle platform.

A vehicle platform according to the present disclosure is a vehicle platform to and from which an autonomous driving kit that gives an instruction for autonomous driving is attachable and detachable, the vehicle platform being configured to be capable of autonomous driving. The vehicle platform includes: a base vehicle; a first vehicle speed specifying function unit and a second vehicle speed specifying function unit each specifying a vehicle speed of the base vehicle; a first vehicle fixing function unit and a second vehicle fixing function unit each carrying out fixation control for fixing the base vehicle; a first vehicle control interface box that relays control communication of the autonomous driving kit with the first vehicle speed specifying function unit and the first vehicle fixing function unit via a first path; and a second vehicle control interface box that relays control communication of the autonomous driving kit with the second vehicle speed specifying function unit and the second vehicle fixing function unit via a second path. At the time of occurrence of a one-system failure that makes communication or control via the first path or the second path impossible, each of the first vehicle control interface box and the second vehicle control interface box carries out limp home traveling control including deceleration in accordance with an instruction from the autonomous driving kit. At the time of occurrence of a two-system failure that makes communication or control via the first path and the second path impossible, in a case where the vehicle speed can be obtained from one of the first vehicle speed specifying function unit and the second vehicle speed specifying function unit, an activatable one of the first vehicle fixing function unit and the second vehicle fixing function unit carries out the fixation control, when the vehicle speed becomes zero, and in a case where the vehicle speed cannot be obtained from any of the first vehicle speed specifying function unit and the second vehicle speed specifying function unit, the activatable one of the first vehicle fixing function unit and the second vehicle fixing function unit carries out the fixation control after a lapse of a first prescribed time period from a time-counting start moment, when the vehicle speed immediately before the occurrence of the two-system failure is less than a prescribed value, and carries out the fixation control after a lapse of a second prescribed time period from the time-counting start moment, when the vehicle speed immediately before the occurrence of the two-system failure exceeds the prescribed value, the second prescribed time period being longer than the first prescribed time period.

According to such a configuration, even in the case where the two-system failure occurs and the vehicle speed cannot be obtained, the fixation control for fixing the base vehicle is carried out after the lapse of the first prescribed time period from the time-counting start moment, when the vehicle speed immediately before the occurrence of the two-system failure is less than the prescribed value, and the fixation control is carried out after the lapse of the second prescribed time period from the time-counting start moment, when the vehicle speed immediately before the occurrence of the two-system failure exceeds the prescribed value, the second prescribed time period being longer than the first prescribed time period. As a result, the vehicle platform in which appropriate fallback control can be carried out even when a communication path between the autonomous driving kit and the vehicle platform fails can be provided.

At the time of the occurrence of the two-system failure, the activatable one of the first vehicle fixing function unit and the second vehicle fixing function unit may carry out the fixation control, when communication with the autonomous driving kit is possible and an instruction for the fixation control is received from the autonomous driving kit.

According to such a configuration, when the instruction for the fixation control can be received from the autonomous driving kit, the instruction from the autonomous driving kit is followed, and thus, control can be carried out in accordance with an intention of the autonomous driving kit.

The vehicle platform may further include: a high-voltage power storage device that stores electric power for travel used for travel of the base vehicle; a first low-voltage power storage device that is charged with electric power of the high-voltage power storage device after a high voltage of the electric power of the high-voltage power storage device is stepped down, and supplies electric power to the first vehicle speed specifying function unit, the first vehicle fixing function unit and the first vehicle control interface box; and a second low-voltage power storage device that is charged with electric power from the first low-voltage power storage device and supplies electric power to the second vehicle speed specifying function unit, the second vehicle fixing function unit and the second vehicle control interface box. The time-counting start moment may be a moment at which the one-system failure occurs and power supply from the first low-voltage power storage device fails.

According to such a configuration, when the power supply from the first low-voltage power storage device fails, the electric power is no longer supplied to the second low-voltage power storage device. Therefore, when the electric power of the second low-voltage power storage device is consumed, not only the first vehicle speed specifying function unit, the first vehicle fixing function unit and the first vehicle control interface box but also the second vehicle speed specifying function unit, the second vehicle fixing function unit and the second vehicle control interface box cannot be operated. Thus, the moment at which the one-system failure occurs and the power supply from the first low-voltage power storage device fails is set as the time-counting start moment for counting a time period that elapses until the fixation control is carried out, whereby the fixation control can be carried out at appropriate timing.

At the time of the occurrence of the two-system failure, each of the first vehicle fixing function unit and the second vehicle fixing function unit may carry out emergency stop control.

According to such a configuration, at the time of the occurrence of the two-system failure, emergency stop of the base vehicle can be appropriately carried out.

According to another aspect of the present disclosure, a method for controlling a vehicle platform is a method for controlling a vehicle platform to and from which an autonomous driving kit that gives an instruction for autonomous driving is attachable and detachable, the vehicle platform being configured to be capable of autonomous driving. The vehicle platform includes: a base vehicle; a first vehicle speed specifying function unit and a second vehicle speed specifying function unit each specifying a vehicle speed of the base vehicle; a first vehicle fixing function unit and a second vehicle fixing function unit each carrying out fixation control for fixing the base vehicle; a first vehicle control interface box that relays control communication of the autonomous driving kit with the first vehicle speed specifying function unit and the first vehicle fixing function unit via a first path; and a second vehicle control interface box that relays control communication of the autonomous driving kit with the second vehicle speed specifying function unit and the second vehicle fixing function unit via a second path. The method includes: at the time of occurrence of a one-system failure that makes communication or control via the first path or the second path impossible, carrying out, by each of the first vehicle control interface box and the second vehicle control interface box, limp home traveling control including deceleration in accordance with an instruction from the autonomous driving kit; at the time of occurrence of a two-system failure that makes communication or control via the first path and the second path impossible, in a case where the vehicle speed can be obtained from one of the first vehicle speed specifying function unit and the second vehicle speed specifying function unit, carrying out, by an activatable one of the first vehicle fixing function unit and the second vehicle fixing function unit, the fixation control, when the vehicle speed becomes zero; and in a case where the vehicle speed cannot be obtained from any of the first vehicle speed specifying function unit and the second vehicle speed specifying function unit, carrying out, by the activatable one of the first vehicle fixing function unit and the second vehicle fixing function unit, the fixation control after a lapse of a first prescribed time period from a time-counting start moment, when the vehicle speed immediately before the occurrence of the two-system failure is less than a prescribed value, and carrying out, by the activatable one of the first vehicle fixing function unit and the second vehicle fixing function unit, the fixation control after a lapse of a second prescribed time period from the time-counting start moment, when the vehicle speed immediately before the occurrence of the two-system failure exceeds the prescribed value, the second prescribed time period being longer than the first prescribed time period.

According to such a configuration, the method for controlling the vehicle platform in which appropriate fallback control can be carried out even when a communication path between the autonomous driving kit and the vehicle platform fails can be provided.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
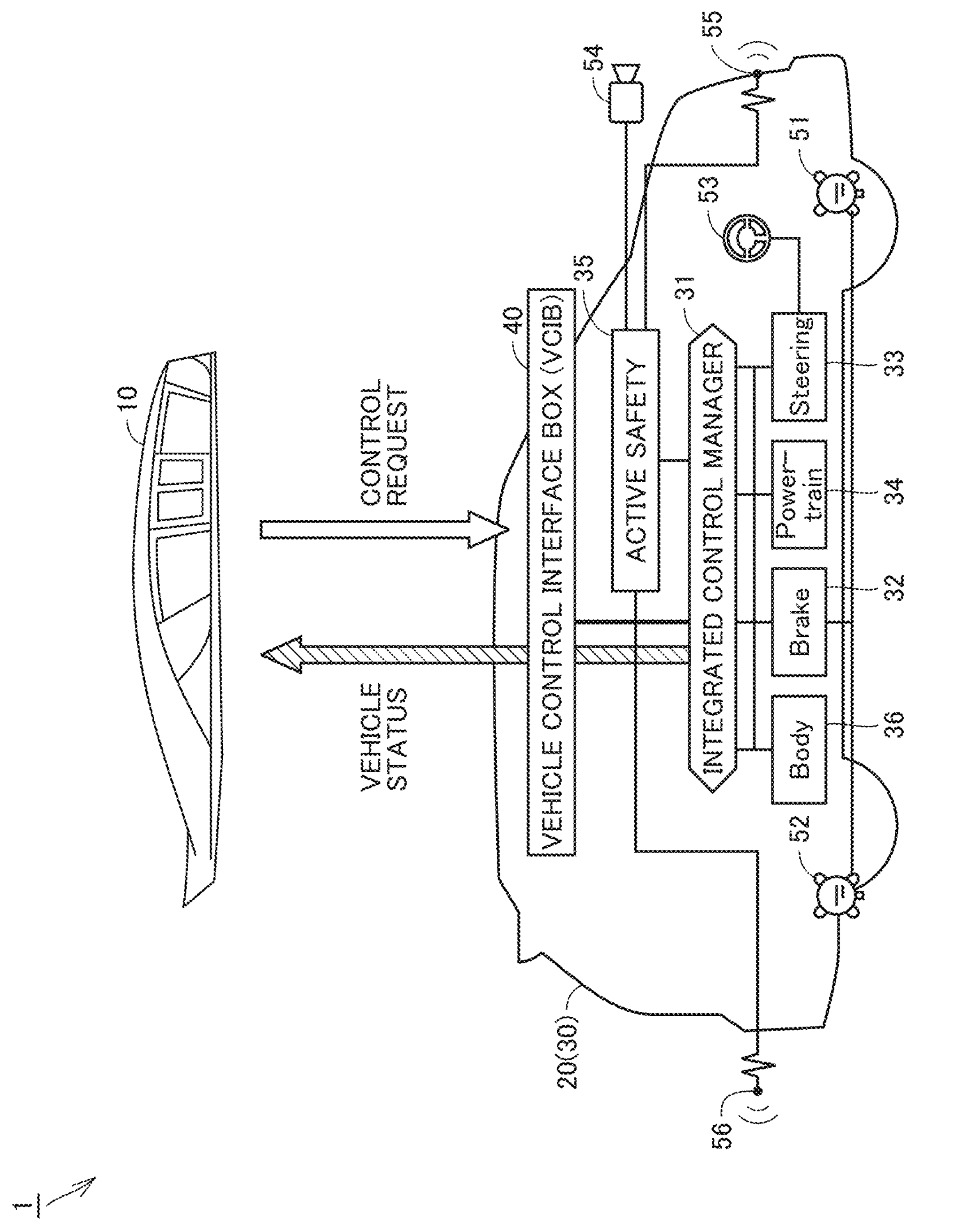
FIG. 1 is a diagram showing overview of a vehicle according to an embodiment of the present disclosure.

An embodiment of the present disclosure will be described below in detail with reference to the drawings. The same or corresponding elements in the drawings have the same reference characters allotted and description thereof will not be repeated.

Figure 2:
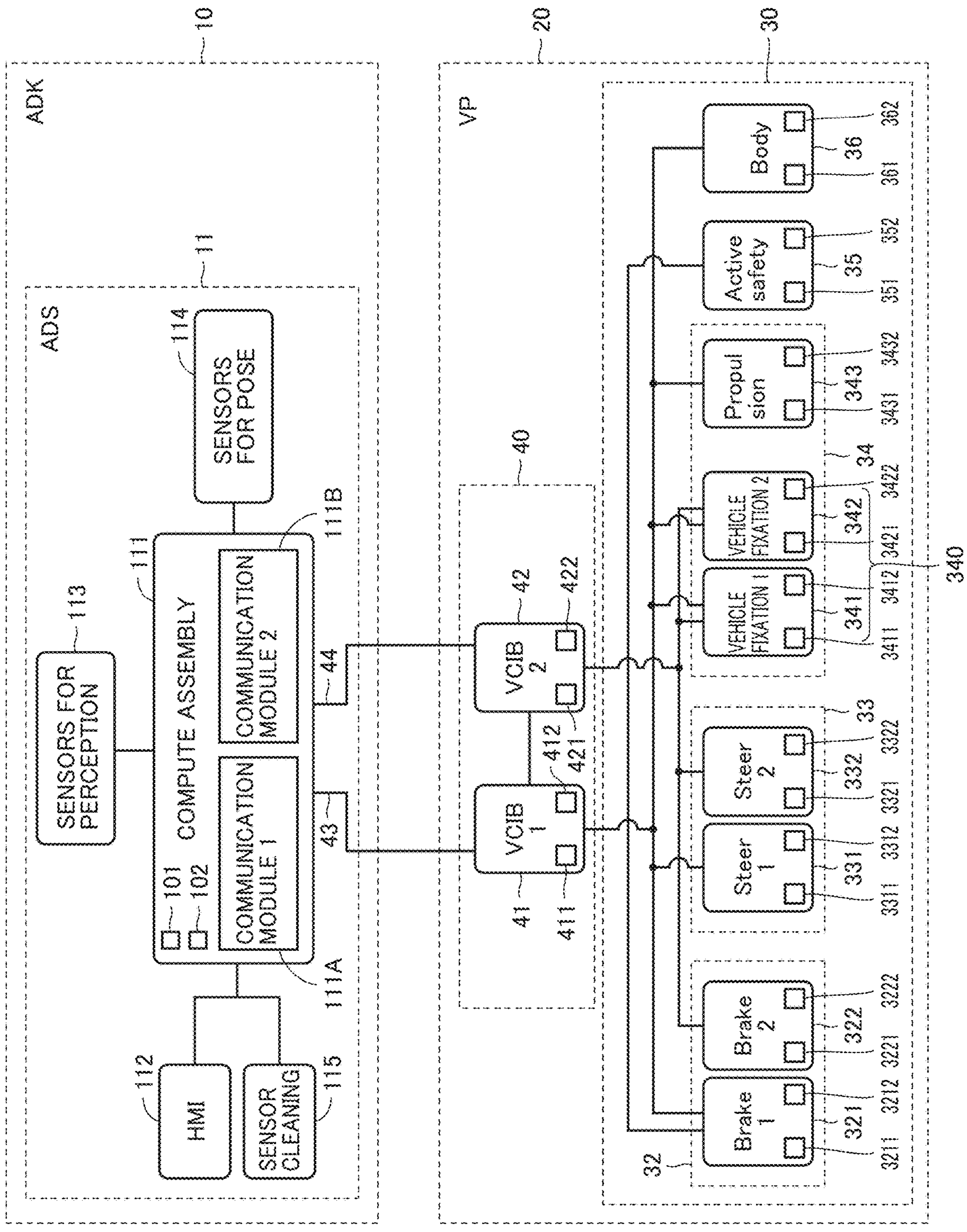
FIG. 2 is a diagram showing in detail configurations of an ADK, a VCIB and a VP according to the present embodiment.

FIG. 1 is a diagram showing overview of a vehicle 1 according to an embodiment of the present disclosure. FIG. 2 is a diagram showing in detail configurations of an ADK 10, a VCIB 40 and a VP 20 according to the present embodiment. Referring to FIGS. 1 and 2, vehicle 1 includes ADK 10 and VP 20. ADK 10 is configured as being attachable to VP 20 (mountable on vehicle 1). ADK 10 and VP 20 are configured to communicate with each other through VCIB 40.

VP 20 can carry out autonomous driving in accordance with control requests from ADK 10. Though FIG. 1 shows ADK 10 at a position distant from VP 20, ADK 10 is actually attached to a rooftop or the like of VP 20. ADK 10 can also be removed from VP 20. While ADK 10 is not attached, VP 20 carries out travel control (travel control in accordance with an operation by a user) in a manual mode (manual driving mode).

ADK 10 includes an autonomous driving system (ADS) 11 for autonomous driving of vehicle 1. For example, ADS 11 creates a driving plan of vehicle 1. ADS 11 outputs various control requests for travel of vehicle 1 in accordance with the driving plan to VP 20 in accordance with an application program interface (API) defined for each control request. ADS 11 receives various signals indicating vehicle statuses (statuses of VP 20) from VP 20 in accordance with the API defined for each signal. Then, ADS 11 has the vehicle status reflected on the driving plan.

VP 20 includes a base vehicle 30 and VCIB 40. Base vehicle 30 carries out various types of vehicle control in accordance with a control request from ADK 10 (ADS 11). Base vehicle 30 includes various vehicle-mounted systems and various sensors for controlling base vehicle 30. More specifically, base vehicle 30 includes an integrated control manager 31, a brake system 32, a steering system 33, a powertrain system 34, an active safety system 35, a body system 36, wheel speed sensors 51 and 52, a pinion angle sensor 53, a camera 54, and radar sensors 55 and 56.

Integrated control manager 31 includes a processor such as a central processing unit (CPU) and a memory such as a read only memory (ROM) and a random access memory (RAM), and integrally controls the systems (brake system 32, steering system 33, powertrain system 34, active safety system 35, and body system 36) involved with operations of vehicle 1.

Brake system 32 is configured to control a braking apparatus provided in each wheel of base vehicle 30. The braking apparatus includes, for example, a disc brake system that is operated with a hydraulic pressure regulated by an actuator.

Wheel speed sensors 51 and 52 are connected to brake system 32. Wheel speed sensors 51 and 52 detect rotation speeds of a front wheel and a rear wheel of base vehicle 30 and output the detected rotation speeds of the front wheel and the rear wheel to brake system 32, respectively. Brake system 32 outputs to VCIB 40, the rotation speed of each wheel as one of pieces of information included in the vehicle statuses. Brake system 32 generates a braking command to a braking apparatus in accordance with a prescribed control request outputted from ADS 11 through VCIB 40 and integrated control manager 31. Brake system 32 controls the braking apparatus based on the generated braking command. Integrated control manager 31 can calculate a speed of vehicle 1 (vehicle speed) based on the rotation speed of each wheel.

Steering system 33 is configured to control a steering angle (wheel steer angle) of a steering wheel of vehicle 1 with a steering apparatus. The steering apparatus includes, for example, rack-and-pinion electric power steering (EPS) that allows adjustment of a steering angle by an actuator.

Pinion angle sensor 53 is connected to steering system 33. Pinion angle sensor 53 detects an angle of rotation of a pinion gear (a pinion angle) coupled to a rotation shaft of the actuator and outputs the detected pinion angle to steering system 33. Steering system 33 outputs to VCIB 40, the pinion angle as one of pieces of information included in the vehicle statuses. Steering system 33 generates a steering command to the steering apparatus in accordance with a prescribed control request outputted from ADS 11 through VCIB 40 and integrated control manager 31. Steering system 33 controls the steering apparatus based on the generated steering command.

Powertrain system 34 controls vehicle fixation systems 341 and 342 that control an electric parking brake (EPB) provided in at least one of a plurality of wheels and a parking lock (P-Lock) apparatus provided in a transmission of vehicle 1, and a propulsion system 343 including a shift apparatus configured to allow selection of a shift range.

Active safety system 35 detects an obstacle (a pedestrian, a bicycle, a parked vehicle, a utility pole, or the like) in front or in the rear with the use of camera 54 and radar sensors 55 and 56. Active safety system 35 determines whether or not vehicle 1 may collide with the obstacle based on a distance between vehicle 1 and the obstacle and a direction of movement of vehicle 1. When active safety system 35 determines that there is possibility of collision, it outputs a braking command to brake system 32 through integrated control manager 31 so as to increase braking force.

Body system 36 is configured to control, for example, components such as a direction indicator (a turn lamp or a hazard light), a horn, a wiper, a headlamp and a brake lamp, depending on a state of travel or an environment around vehicle 1. Body system 36 controls each component in accordance with a prescribed control request outputted from ADS 11 through VCIB 40 and integrated control manager 31.

VCIB 40 is configured to communicate with ADS 11 over a controller area network (CAN). VCIB 40 receives various control requests from ADS 11 or outputs a vehicle status to ADS 11 by executing a prescribed API defined for each signal. When VCIB 40 receives the control request from ADK 10, it outputs a control command corresponding to the control request to a system corresponding to the control command through integrated control manager 31. VCIB 40 obtains various types of information on base vehicle 30 from various systems through integrated control manager 31 and outputs the status of base vehicle 30 as the vehicle status to ADS 11.

Vehicle 1 may be used as one of constituent elements of a mobility as a service (MaaS) system. The MaaS system includes, for example, a data server and a mobility service platform (MSPF), in addition to vehicle 1.

The MSPF is an integrated platform to which various mobility services are connected. Autonomous driving related mobility services are connected to the MSPF. In addition to the autonomous driving related mobility services, mobility services provided by a ride-share company, a car-sharing company, a rent-a-car company, a taxi company, and an insurance company may be connected to the MSPF.

Vehicle 1 further includes a data communication module (DCM) capable of wirelessly communicating with a data server. The DCM outputs vehicle information such as a speed, a position, or an autonomous driving state to the data server. The DCM receives from the autonomous driving related mobility services through the MSPF and the data server, various types of data for management of travel of an autonomous driving vehicle including vehicle 1 in the mobility services.

The MSPF publishes APIs for using various types of data on vehicle statuses and vehicle control necessary for development of ADS 11. Various mobility services can use various functions provided by the MSPF depending on service contents, by using the APIs published on the MSPF. For example, the autonomous driving related mobility services can obtain operation control data of vehicle 1 or information stored in the data server from the MSPF by using the APIs published on the MSPF. The autonomous driving related mobility services can transmit data for managing an autonomous driving vehicle including vehicle 1 to the MSPF by using the API.

ADS 11 includes a compute assembly 111, a human machine interface (HMI) 112, sensors for perception 113, sensors for pose 114, and a sensor cleaning 115.

Compute assembly 111 includes a processor 101 such as a CPU and a memory 102 such as a ROM and a RAM. A program executable by processor 101 is stored in memory 102. During autonomous driving of vehicle 1, compute assembly 111 obtains information indicating an environment around vehicle 1 and information indicating a pose, a behavior, and a position of vehicle 1 from various sensors (which will be described later), and obtains a vehicle status from VP 20 through VCIB 40 and sets a next operation (acceleration, deceleration, or turning) of vehicle 1. Compute assembly 111 outputs various commands for realizing a next operation to VCIB 40. Compute assembly 111 further includes communication modules 111A and 111B. Communication modules 111A and 111B are each configured to communicate with VCIB 40.

HMI 112 presents information to a user and accepts an operation by the user during autonomous driving, during manual driving requiring an operation by the user, or at the time of transition between autonomous driving and manual driving requiring an operation by the user. HMI 112 includes, for example, an input and output apparatus such as a touch panel display provided in base vehicle 30.

Sensors for perception 113 are sensors that perceive an environment around vehicle 1. Sensors for perception 113 include, for example, at least one of laser imaging detection and ranging (LIDAR), a millimeter-wave radar, and a camera. The LIDAR measures a distance and a direction to an object, for example, by emitting laser beams of infrared pulses and detecting laser beams reflected by the object. The millimeter-wave radar measures a distance and a direction to an object by emitting millimeter waves and detecting millimeter waves reflected by the object. The camera is arranged, for example, on a rear side of a room mirror and shoots an image of the front of vehicle 1.

Sensors for pose 114 are sensors that detect a pose, a behavior, or a position of vehicle 1. Sensors for pose 114 include, for example, an inertial measurement unit (IMU) and a global positioning system (GPS). The IMU detects, for example, an acceleration in a front-rear direction, a lateral direction, and a vertical direction of vehicle 1 and an angular speed in a roll direction, a pitch direction, and a yaw direction of vehicle 1. The GPS detects a position of vehicle 1 based on information received from a plurality of GPS satellites that orbit the Earth.

Sensor cleaning 115 is configured to remove with a cleaning solution or a wiper, soiling attached to various sensors (a lens of the camera or a portion from which laser beams are emitted) during traveling of vehicle 1.

VCIB 40 includes a main VCIB 41 and a sub VCIB 42. VCIBs 41 and 42 include processors 411 and 421 such as CPUs and memories 412 and 422 such as ROMs and RAMs, respectively. Programs executable by processors 411 and 421 and data processed by the programs are stored in memories 412 and 422, respectively. Main VCIB 41 and communication module 111A are communicatively connected to each other through a communication bus 43 (main bus). Sub VCIB 42 and communication module 111B are communicatively connected to each other through a communication bus 44 (sub bus). Furthermore, main VCIB 41 and sub VCIB 42 are communicatively connected to each other.

VCIBs 41 and 42 each relay control requests and vehicle information between ADS 11 and VP 20. VCIBs 41 and 42 interface between base vehicle 30 and ADS 11 through communication buses 43 and 44, respectively. VCIBs 41 and 42 each generate a control command from a control request from ADS 11 with the use of an API.

For example, a control command corresponding to a control request supplied from ADS 11 to VCIB 40 includes a propulsion direction command requesting switching of the shift range, an immobilization command requesting activation/deactivation of the EPB and the P-Lock apparatus, an acceleration command requesting acceleration or deceleration of vehicle 1, a wheel steer angle command requesting a wheel steer angle of a steering wheel, an autonomization command requesting switching between an autonomous mode (autonomous driving mode) and a manual mode (manual driving mode), and a standstill command requesting keeping on stationary or keeping off stationary of the vehicle.

Then, VCIBs 41 and 42 each output the generated control command to a corresponding system of a plurality of systems included in VP 20. VCIBs 41 and 42 each generate information indicating a vehicle status from the vehicle information from each system of VP 20 with the use of the API. The information indicating the vehicle status may be information identical to the vehicle information or may be information extracted from the vehicle information to be used for processing performed by ADS 11. VCIBs 41 and 42 each output the generated information indicating the vehicle status to ADS 11.

Brake system 32 includes brake systems 321 and 322. Steering system 33 includes steering systems 331 and 332. Powertrain system 34 includes a vehicle fixation system 340 and propulsion system 343. Vehicle fixation system 340 includes vehicle fixation systems 341 and 342.

Though VCIB 41 and VCIB 42 are basically equivalent in function to each other, they are partially different in systems connected thereto that are included in VP 20. Specifically, main VCIB 41, brake system 321, steering system 331, vehicle fixation systems 341 and 342, propulsion system 343, and body system 36 are communicatively connected to one another through a communication bus. Sub VCIB 42, brake system 322, steering system 332, and vehicle fixation systems 341 and 342 are communicatively connected to one another through a communication bus.

As VCIBs 41 and 42 equivalent in function relating to an operation of at least one of (for example, braking or steering) systems are thus included in VCIB 40, control systems between ADS 11 and VP 20 are redundant. Thus, when some kind of failure occurs in the system, the function of VP 20 can be maintained by switching between the control systems as appropriate or disconnection of a control system where failure has occurred.

Brake systems 321 and 322 include processors 3211 and 3221 such as CPUs and memories 3212 and 3222 such as ROMs and RAMs, respectively. Brake systems 321 and 322 are each configured to control a braking apparatus. Brake systems 321 and 322 generate braking commands to the braking apparatus in accordance with control requests outputted from ADS 11 through VCIBs 41 and 42, respectively. Brake system 321 and brake system 322 may be equivalent in function to each other. Alternatively, one of brake systems 321 and 322 may be configured to independently control braking force of each wheel and the other thereof may be configured to control braking force such that equal braking force is generated in the wheels. For example, brake systems 321 and 322 may control the braking apparatus based on a braking command generated by any one of them, and when a failure occurs in that brake system, they may control the braking apparatus based on a braking command generated by the other of them.

Steering systems 331 and 332 include processors 3311 and 3321 such as CPUs and memories 3312 and 3322 such as ROMs and RAMs, respectively. Steering systems 331 and 332 are each configured to control a steering angle of a steering wheel of vehicle 1 with a steering apparatus. Steering systems 331 and 332 generate steering commands to the steering apparatus in accordance with control requests outputted from ADS 11 through VCIBs 41 and 42, respectively. Steering system 331 and steering system 332 may be equivalent in function to each other. Alternatively, steering systems 331 and 332 may control the steering apparatus based on the steering command generated by any one of them, and when a failure occurs in that steering system, they may control the steering apparatus based on a steering command generated by the other of them.

Vehicle fixation systems 341 and 342 include processors 3411 and 3421 such as CPUs and memories 3412 and 3422 such as ROMs and RAMs, respectively. Vehicle fixation systems 341 and 342 each control the EPB and the P-Lock apparatus in accordance with control requests outputted from ADS 11 through VCIBs 41 and 42. The EPB is provided separately from the braking apparatus (a disc brake system or the like), and fixes a wheel by an operation of an actuator. The EPB, for example, activates with an actuator, a drum brake for a parking brake provided in at least one of a plurality of wheels to fix the wheel, or activates a braking apparatus to fix a wheel with an actuator capable of regulating a hydraulic pressure to be supplied to the braking apparatus separately from brake systems 321 and 322. Vehicle fixation systems 341 and 342 have a brakeholding function, and are configured to switch between activation and release of brakehold.

For example, when the control request includes a control request to set the shift range to a parking range (P range), vehicle fixation systems 341 and 342 each activate the P-Lock apparatus, and when the control request includes a control request to set the shift range to a shift range other than the P range, vehicle fixation systems 341 and 342 each deactivate the P-Lock apparatus. The P-Lock apparatus fits a protrusion provided at a tip end of a parking lock pawl, a position of which is adjusted by an actuator, into a tooth of a gear (locking gear) provided as being coupled to a rotational element in the transmission of vehicle 1. Rotation of an output shaft of the transmission is thus fixed and the wheel is fixed.

Propulsion system 343 includes a processor 3431 such as a CPU and a memory 3432 such as a ROM and a RAM. Propulsion system 343 includes a direction control system and a propulsive system. The direction control system is connected to VCIB 40. The direction control system controls a direction of travel (forward travel or rearward travel) of VP 20 by switching the shift range of the shift apparatus in accordance with the control request outputted from ADS 11 through VCIB 41. The shift ranges include a forward travel range (D range) and a rearward travel range (R range) in addition to the P range and a neutral range (N range). The propulsive system is connected to VCIB 40. The propulsive system controls propulsive force (for example, acceleration and deceleration) of VP 20 by controlling driving force from a drive source (a motor generator and an engine).

Active safety system 35 includes a processor 351 such as a CPU and a memory 352 such as a ROM and a RAM. Active safety system 35 is communicatively connected to brake system 321. As described previously, active safety system 35 detects an obstacle in front by using camera 54 and/or radar sensor 55, and when it determines that there is possibility of collision, it outputs a braking command to brake system 321 so as to increase braking force.

Body system 36 includes a processor 361 such as a CPU and a memory 362 such as a ROM and a RAM. Body system 36 controls components such as a direction indicator, a horn, and a wiper in accordance with a control request outputted from ADS 11 through VCIB 41.

For example, when an autonomous mode (autonomous driving mode) is selected by an operation by the user onto HMI 112 in vehicle 1, autonomous driving is carried out. During autonomous driving, ADS 11 initially creates a driving plan as described previously. Examples of the driving plan include a plan to continue straight travel, a plan to turn left/right at a prescribed intersection on a predetermined travel path, and a plan to change a travel lane. ADS 11 calculates a controllable physical quantity (an acceleration, a deceleration, and a wheel steer angle) necessary for operations of vehicle 1 in accordance with the created driving plan. ADS 11 splits the physical quantity for each execution cycle time of the API. ADS 11 outputs a control request representing the split physical quantity to VCIB 40 by means of the API. Furthermore, ADS 11 obtains a vehicle status (an actual direction of movement of vehicle 1 and a state of fixation of the vehicle) from VP 20 and creates again the driving plan on which the obtained vehicle status is reflected. ADS 11 thus allows autonomous driving of vehicle 1.

As described above, in vehicle 1, as paths through which signals are exchanged between ADK 10 and VP 20, there are two systems, i.e., a first path via communication bus 43 serving as a main bus and main VCIB 41 and a second path via communication bus 44 serving as a sub bus and sub VCIB 42. Conventionally, carrying out appropriate fallback control when both of these two paths fail has not been considered.

Thus, at the time of occurrence of a one-system failure that makes communication or control via the first path or the second path impossible, each of VCIBs 41 and 42 carries out limp home traveling control including deceleration in accordance with an instruction from ADK 10. At the time of occurrence of a two-system failure that makes communication or control via the first path and the second path impossible, in a case where the vehicle speed can be obtained from one of brake systems 321 and 322, an activatable one of vehicle fixation systems 341 and 342 carries out fixation control for fixing base vehicle 30, when the vehicle speed becomes zero, and in a case where the vehicle speed cannot be obtained from any of brake systems 321 and 322, the activatable one of vehicle fixation systems 341 and 342 carries out the fixation control after a lapse of a first prescribed time period from a time-counting start moment, when the vehicle speed immediately before the occurrence of the two-system failure is less than a prescribed value, and carries out the fixation control after a lapse of a second prescribed time period from the time-counting start moment, when the vehicle speed immediately before the occurrence of the two-system failure exceeds the prescribed value, the second prescribed time period being longer than the first prescribed time period.

Therefore, even in the case where the two-system failure occurs and the vehicle speed cannot be obtained, the fixation control is carried out after the lapse of the first prescribed time period from the time-counting start moment, when the vehicle speed immediately before the occurrence of the two-system failure is less than the prescribed value, and the fixation control is carried out after the lapse of the second prescribed time period from the time-counting start moment, when the vehicle speed immediately before the occurrence of the two-system failure exceeds the prescribed value, the second prescribed time period being longer than the first prescribed time period. As a result, even when a communication path between ADK 10 and VP 20 fails, appropriate fallback control can be carried out.

Figure 3:
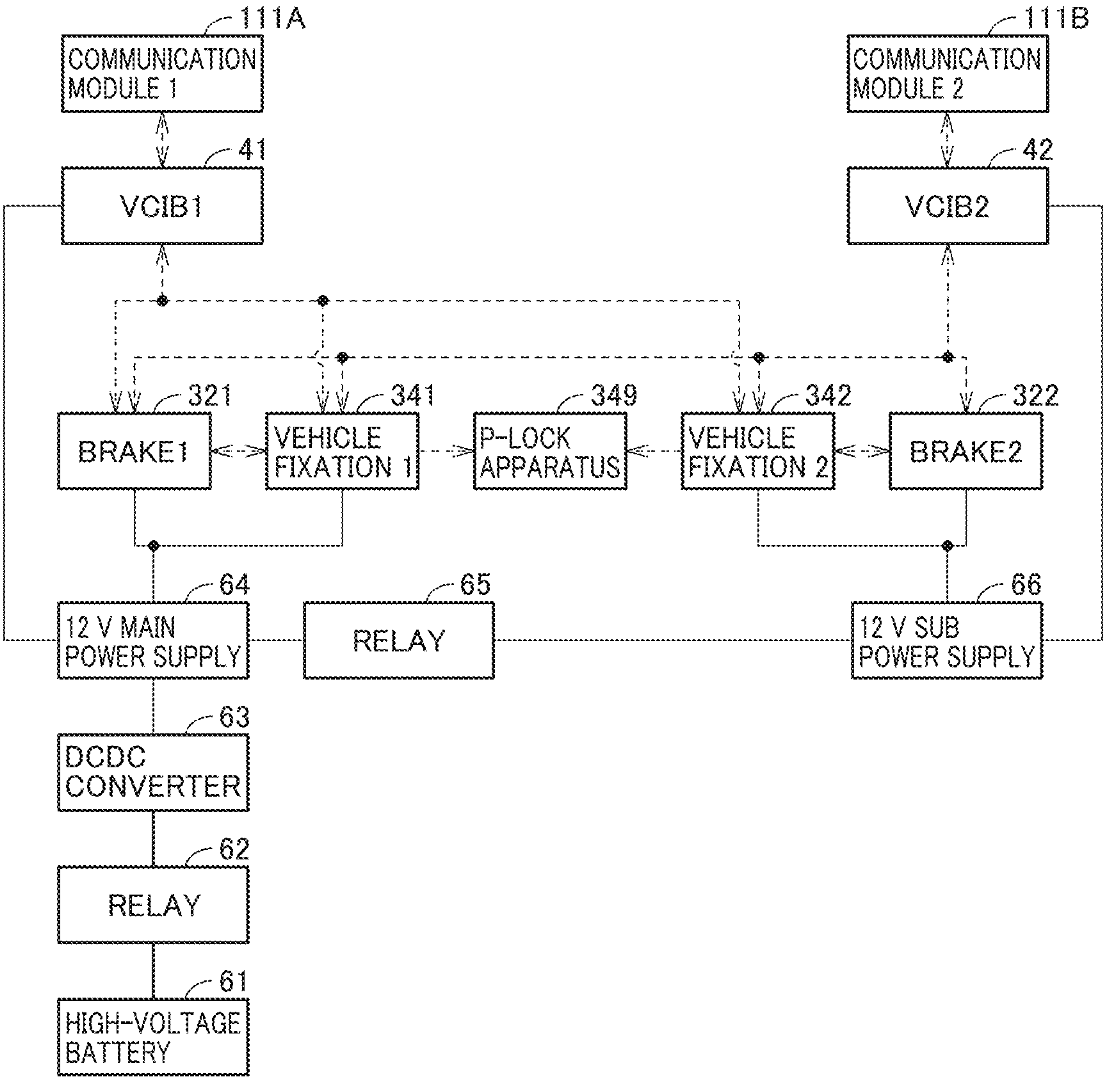
FIG. 3 is a block diagram for illustrating power supply and communication between control systems and VCIBs in the present embodiment.

FIG. 3 is a block diagram for illustrating power supply and communication between control systems and VCIBs 41 and 42 in the present embodiment. Referring to FIG. 3, base vehicle 30 includes, as a configuration relating to power supply, a high-voltage battery 61, a relay 62, a DC (direct current) DC converter 63, a 12 V main power supply 64, a relay 65, and a 12 V sub power supply 66.

High-voltage battery 61 is a secondary battery that stores electric power of a high voltage (e.g., several hundred volts) used mainly for travel of the base vehicle with a motor generator. Though high-voltage battery 61 is implemented by, for example, a lithium ion battery, the present disclosure is not limited thereto. High-voltage battery 61 may be any other type of secondary battery and may be a nickel-metal hydride battery or an all-solid-state battery.

12 V main power supply 64 is a secondary battery that stores electric power of a low voltage (in the present embodiment, 12 V) used in control systems (e.g., VCIB 41, brake system 321 and vehicle fixation system 341) on the first path via communication bus 43 serving as a main bus and main VCIB 41. Though 12 V main power supply 64 is implemented by, for example, a lead-acid battery, the present disclosure is not limited thereto. 12 V main power supply 64 may be any other type of secondary battery and may be a lithium ion battery.

DCDC converter 63 converts the high voltage of the electric power of high-voltage battery 61 into the low voltage of the electric power of 12 V main power supply 64 and supplies the electric power of the low voltage to 12 V main power supply 64. Relay 62 performs switching between connection and disconnection of a power line between high-voltage battery 61 and DCDC converter 63.

12 V sub power supply 66 is a secondary battery that stores electric power of a low voltage (in the present embodiment, 12 V) used in control systems (e.g., VCIB 42, brake system 322 and vehicle fixation system 342) on the second path via communication bus 44 serving as a sub bus and sub VCIB 42. Though 12 V sub power supply 66 is implemented by, for example, a lithium ion battery, the present disclosure is not limited thereto. 12 V sub power supply 66 may be any other type of secondary battery and may be a nickel-metal hydride battery or an all-solid-state battery. Electric power is supplied to 12 V sub power supply 66 from 12 V main power supply 64. Relay 65 performs switching between connection and disconnection of a power line between 12 V main power supply 64 and 12 V sub power supply 66.

VCIBs 41 and 42 can communicate with communication modules 111A and 111B of compute assembly 111 of ADS 11 via communication buses 43 and 44, respectively. VCIB 41, brake system 321 and vehicle fixation systems 341 and 342 can communicate with one another. VCIB 42, brake systems 321 and 322, and vehicle fixation systems 341 and 342 can communicate with one another. Vehicle fixation systems 341 and 342 control a P-Lock apparatus 349 by transmitting control signals to P-Lock apparatus 349.

Figure 4:
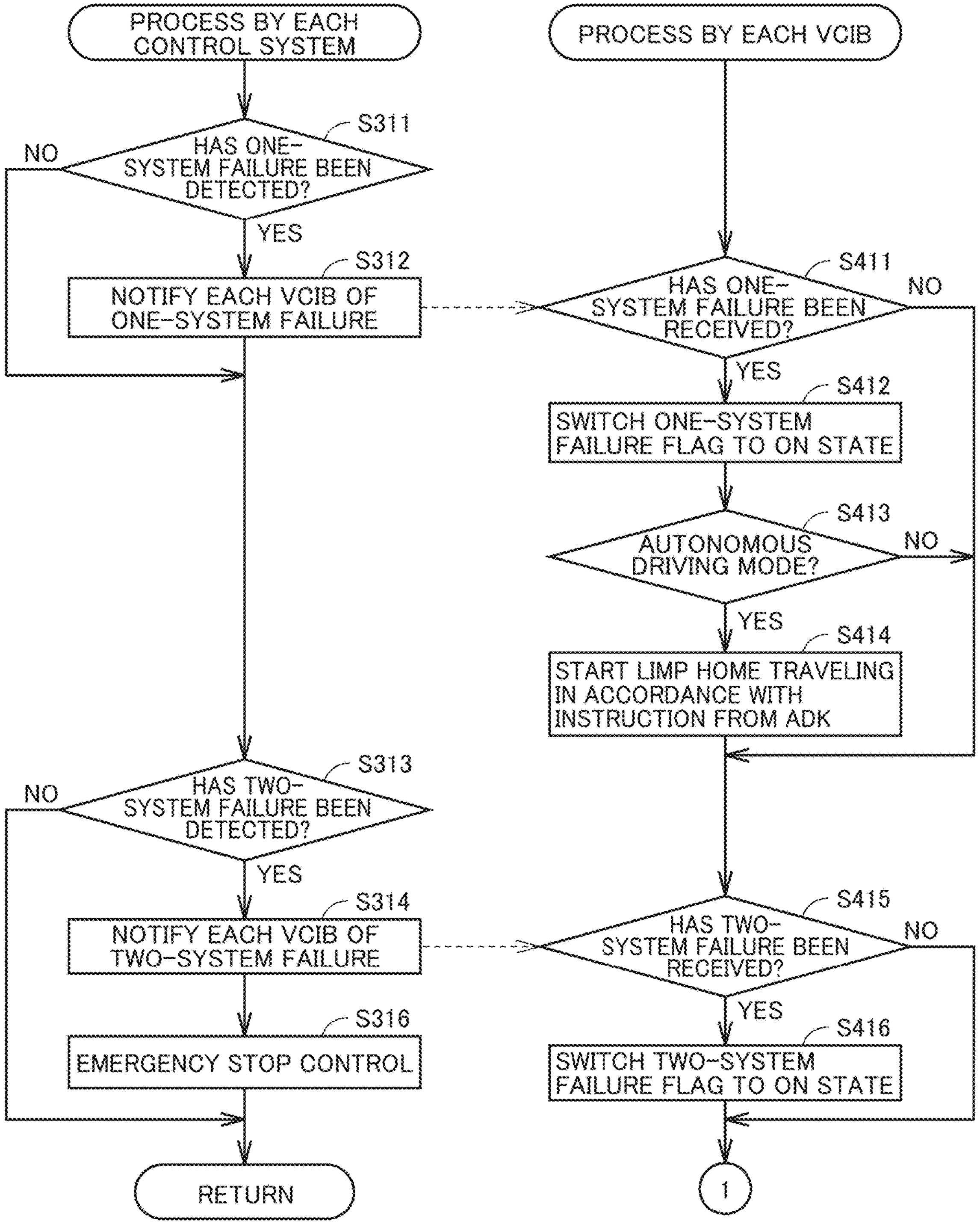
FIG. 4 is a flowchart showing a flow of a process performed by each control system and a first process performed by each VCIB in the present embodiment.

FIG. 4 is a flowchart showing a flow of a process performed by each control system and a first process performed by each of VCIBs 41 and 42 in the present embodiment. Referring to FIG. 4, the process by each control system is called from a higher-level process and performed at prescribed cycles by a processor of a control system of base vehicle 30 (e.g., each of processors 3211 and 3221 of brake systems 321 and 322 and processors 3411 and 3421 of vehicle fixation systems 341 and 342). The process by each VCIB is called from a higher-level process and performed at prescribed cycles by each of processors 411 and 421 of VCIBs 41 and 42.

The processor of the control system determines whether or not the one-system failure that makes communication or control via the first path or the second path impossible has been detected (step S311). When the processor of the control system determines that the one-system failure has been detected (YES in step S311), the processor of the control system notifies each of VCIBs 41 and 42 that the one-system failure has been detected (step S312).

Each of processors 411 and 421 of VCIBs 41 and 42 determines whether or not it has received a notification about detection of the one-system failure from the control system (step S411). When each of processors 411 and 421 of VCIBs 41 and 42 determines that it has received the notification about detection of the one-system failure from any control system (YES in step S411), each of processors 411 and 421 of VCIBs 41 and 42 switches a one-system failure flag indicating whether or not the one-system failure has occurred to an ON state indicating that the one-system failure has occurred (step S412).

Each of processors 411 and 421 of VCIBs 41 and 42 determines whether or not the driving mode of each of VCIBs 41 and 42 is the autonomous driving mode (step S413). When each of processors 411 and 421 of VCIBs 41 and 42 determines that the driving mode of each of VCIBs 41 and 42 is the autonomous driving mode (YES in step S413), each of processors 411 and 421 of VCIBs 41 and 42 starts limp home traveling control in accordance with an instruction from ADK 10 (step S414). The limp home traveling is traveling for evacuating to a place safer than a place on a road, such as an off-the-road place, a rest area, a parking lot or a roadside.

The processor of the control system determines whether or not the two-system failure that makes communication or control via the first path and the second path impossible has been detected (step S313). When the processor of the control system determines that the two-system failure has been detected (YES in step S313), the processor of the control system notifies each of VCIBs 41 and 42 that the two-system failure has been detected (step S314) and carries out control for emergency stop of base vehicle 30 (step S316). The control for emergency stop may include only deceleration control, or may include minimum steering control for moving base vehicle 30 to a roadside or the like safer than a place on a lane, in addition to the deceleration control. When the processor of the control system determines that the two-system failure has not been detected (NO in step S313), or after step S316, the processor of the control system returns the process to be performed to the higher-level process from which this process by each control system was called.

When each of processors 411 and 421 of VCIBs 41 and 42 determines that it has not received the notification about detection of the one-system failure from any control system (NO in step S411), when each of processors 411 and 421 of VCIBs 41 and 42 determines that the driving mode of each of VCIBs 41 and 42 is not the autonomous driving mode (NO in step S413), or after step S414, each of processors 411 and 421 of VCIBs 41 and 42 determines whether or not it has received a notification about detection of the two-system failure from the control system (step S415). When each of processors 411 and 421 of VCIBs 41 and 42 determines that it has received the notification about detection of the two-system failure from any control system (YES in step S415), each of processors 411 and 421 of VCIBs 41 and 42 switches a two-system failure flag indicating whether or not the two-system failure has occurred to an ON state indicating that the two-system failure has occurred (step S416). Thereafter, each of processors 411 and 421 of VCIBs 41 and 42 causes the process to be performed to proceed to a process starting from the circled number "1" in FIG. 4 described below.

Figure 5:
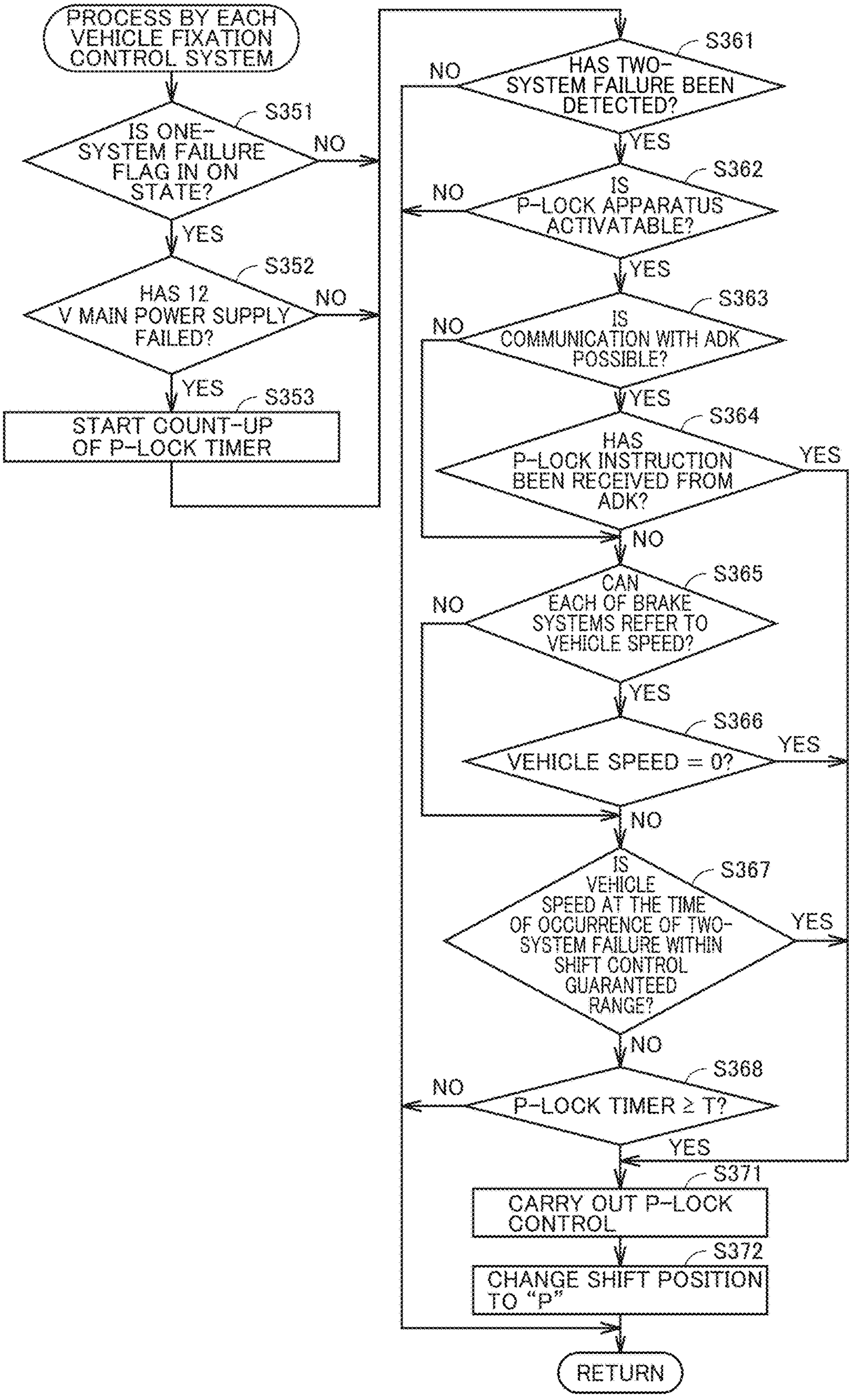
FIG. 5 is a flowchart showing a flow of a process performed by each vehicle fixation system in the present embodiment.

FIG. 5 is a flowchart showing a flow of a process performed by each of vehicle fixation systems 341 and 342 in the present embodiment. Referring to FIG. 5, this process is called from a higher-level process and performed at prescribed cycles by each of processors 3411 and 3421 of vehicle fixation systems 341 and 342.

Each of processors 3411 and 3421 of vehicle fixation systems 341 and 342 inquires each of VCIBs 41 and 42 and determines whether or not the one-system failure flag is in the ON state (step S351). When each of processors 3411 and 3421 of vehicle fixation systems 341 and 342 determines that the one-system failure flag is in the ON state (YES in step S351), each of processors 3411 and 3421 of vehicle fixation systems 341 and 342 determines whether or not the system of 12 V main power supply 64 has failed (step S352). The state in which the system of 12 V main power supply 64 has failed can be determined based on, for example, the impossibility of exchanging signals with the other control systems or VCIB 41 that receive power supply from 12 V main power supply 64.

When each of processors 3411 and 3421 of vehicle fixation systems 341 and 342 determines that the 12 V main power supply has failed (YES in step S352), each of processors 3411 and 3421 of vehicle fixation systems 341 and 342 starts count-up of a P-Lock timer used for control relating to P-Lock (step S353).

When each of processors 3411 and 3421 of vehicle fixation systems 341 and 342 determines that the one-system failure flag is not in the ON state (NO in step S351), when each of processors 3411 and 3421 of vehicle fixation systems 341 and 342 determines that the 12 V main power supply has not failed (NO in step S352), or after step S353, each of processors 3411 and 3421 of vehicle fixation systems 341 and 342 determines whether or not the two-system failure has been detected in step S313 in FIG. 4 (step S361). When each of processors 3411 and 3421 of vehicle fixation systems 341 and 342 determines that the two-system failure has been detected (YES in step S361), each of processors 3411 and 3421 of vehicle fixation systems 341 and 342 determines whether or not P-Lock apparatus 349 is activatable (step S362).

When each of processors 3411 and 3421 of vehicle fixation systems 341 and 342 determines that P-Lock apparatus 349 is activatable (YES in step S362), each of processors 3411 and 3421 of vehicle fixation systems 341 and 342 determines whether or not communication with ADK 10 via each of VCIBs 41 and 42 is possible (step S363). When each of processors 3411 and 3421 of vehicle fixation systems 341 and 342 determines that communication with ADK 10 is possible (YES in step S363), each of processors 3411 and 3421 of vehicle fixation systems 341 and 342 determines whether or not it has received a P-Lock instruction to activate P-Lock apparatus 349 from ADK 10 (step S364).

When each of processors 3411 and 3421 of vehicle fixation systems 341 and 342 determines that communication with ADK 10 is not possible (NO in step S363), or when each of processors 3411 and 3421 of vehicle fixation systems 341 and 342 determines that it has not received the P-Lock instruction from ADK 10 (NO in step S364), each of processors 3411 and 3421 of vehicle fixation systems 341 and 342 determines whether or not each of brake systems 321 and 322 can refer to the vehicle speed (step S365). When each of processors 3411 and 3421 of vehicle fixation systems 341 and 342 determines that each of brake systems 321 and 322 can refer to the vehicle speed (YES in step S365), each of processors 3411 and 3421 of vehicle fixation systems 341 and 342 determines whether or not the vehicle speed to which each of brake systems 321 and 322 refers is zero (step S366).

When each of processors 3411 and 3421 of vehicle fixation systems 341 and 342 determines that each of brake systems 321 and 322 cannot refer to the vehicle speed (NO in step S365), or when each of processors 3411 and 3421 of vehicle fixation systems 341 and 342 determines that the vehicle speed is not zero (NO in step S366), each of processors 3411 and 3421 of vehicle fixation systems 341 and 342 determines whether or not the vehicle speed at the time of occurrence of the two-system failure is within a shift control guaranteed range (step S367). The vehicle speed at the time of occurrence of the two-system failure being within the shift control guaranteed range means that the vehicle speed is within a range in which it is guaranteed by experiments, simulations or the like that P-Lock apparatus 349 does not fail even when P-Lock control is carried out, and means, for example, that the vehicle speed is within a prescribed kilometers per hour.

The time of occurrence of the two-system failure is immediately after the occurrence of the two-system failure, when each of brake systems 321 and 322 can refer to the vehicle speed. However, the time of occurrence of the two-system failure may be immediately before the occurrence of the two-system failure, when each of brake systems 321 and 322 cannot refer to the vehicle speed, or may be immediately before the occurrence of the two-system failure, regardless of whether or not each of brake systems 321 and 322 can refer to the vehicle speed. Immediately before the occurrence of the two-system failure may be, for example, a time period from the time of occurrence of the two-system failure to a time earlier by a prescribed short time period (e.g., a time period of several milliseconds to several seconds) than the time of occurrence of the two-system failure, or may be a time period from a control cycle at the time of occurrence of the two-system failure to a control cycle earlier by the prescribed number of times (e.g., any one of one time to several times) than the control cycle at the time of occurrence of the two-system failure. Immediately after the occurrence of the two-system failure may be, for example, a time period from the time of occurrence of the two-system failure to a time later by a prescribed short time period (e.g., a time period of several milliseconds to several seconds) than the time of occurrence of the two-system failure, or may be a time period from a control cycle at the time of occurrence of the two-system failure to a control cycle later by the prescribed number of times (e.g., any one of one time to several times) than the control cycle at the time of occurrence of the two-system failure.

When each of processors 3411 and 3421 of vehicle fixation systems 341 and 342 determines that the vehicle speed is not within the shift control guaranteed range (NO in step S367), each of processors 3411 and 3421 of vehicle fixation systems 341 and 342 determines whether or not a count value of the P-Lock timer that started count-up in step S353 is equal to or larger than a value indicating a prescribed time period T (step S368). Prescribed time period T is a time period during which 12 V sub power supply 66 can supply electric power, and may be, for example, a time period during which 12 V sub power supply 66 can supply electric power from a fully-charged state in the absence of power supply, or may be a time period during which 12 V sub power supply 66 can supply electric power from a prescribed SOC in the absence of power supply.

When each of processors 3411 and 3421 of vehicle fixation systems 341 and 342 determines that it has received the P-Lock instruction from ADK 10 (YES in step S364), when each of processors 3411 and 3421 of vehicle fixation systems 341 and 342 determines that the vehicle speed is zero (YES in step S366), when each of processors 3411 and 3421 of vehicle fixation systems 341 and 342 determines that the vehicle speed at the time of occurrence of the two-system failure is within the shift control guaranteed range (YES in step S367), or when each of processors 3411 and 3421 of vehicle fixation systems 341 and 342 determines that the count value of the P-Lock timer is equal to or larger than the value indicating prescribed time period T (YES in step S368), each of processors 3411 and 3421 of vehicle fixation systems 341 and 342 carries out the P-Lock control (step S371) and transmits an instruction to change the shift position to the "P" position to propulsion system 343 (step S372).

When each of processors 3411 and 3421 of vehicle fixation systems 341 and 342 determines that the two-system failure has not been detected (NO in step S361), when each of processors 3411 and 3421 of vehicle fixation systems 341 and 342 determines that P-Lock apparatus 349 is not activatable (NO in step S362), when each of processors 3411 and 3421 of vehicle fixation systems 341 and 342 determines that the P-Lock timer is not equal to or larger than prescribed time period T (NO in step S368), or after step S372, each of processors 3411 and 3421 of vehicle fixation systems 341 and 342 returns the process to be performed to the higher-level process from which this process by each vehicle fixation control system was called.

[Modifications]

(1) In the above-described embodiment, as shown in step S365 to step S371 in FIG. 5, even in the case where each of brake systems 321 and 322 cannot refer to the vehicle speed, the P-Lock control is carried out regardless of the count value of the P-Lock timer, when the vehicle speed at the time of occurrence of the two-system failure is within the shift control guaranteed range. However, the present disclosure is not limited thereto. In the case where each of brake systems 321 and 322 cannot refer to the vehicle speed and in the case where the vehicle speed at the time of occurrence of the two-system failure is within the shift range guaranteed range, the P-Lock control may be carried out when the count value of the P-Lock timer is equal to or larger than a value indicating a prescribed time period S. Prescribed time period S is a time period shorter than prescribed time period T shown in step S368. In the above-described embodiment, prescribed time period S is zero.

(2) In the above-described embodiment, when the one-system failure flag is in the ON state and when 12 V main power supply 64 has failed, count-up of the P-Lock timer is started. However, the present disclosure is not limited thereto. The moment of starting count-up of the P-Lock timer may be any other moment, and may be, for example, a moment at which the one-system failure flag enters the ON state, or may be a moment at which 12 V main power supply 64 fails.

(3) In the above-described embodiment, as shown in FIGS. 1 to 3, each of brake systems 321 and 322 specifies the vehicle speed of base vehicle 30. However, the present disclosure is not limited thereto. Another control system or each of VCIBs 41 and 42 may specify the vehicle speed of base vehicle 30.

(4) In the above-described embodiment, each of the first function unit and the second function unit such as brake systems 321 and 322, vehicle fixation systems 341 and 342, or steering systems 331 and 332 that perform a specific function used for autonomous driving and manual driving has the processor and the memory. The first function unit and the second function unit perform the specific function of base vehicle 30 in cooperation with VCIBs 41 and 42. However, VCIBs 41 and 42 and the processor and the memory of each function unit may share the functions in any way. For example, a part of the function performed by the processor and the memory of each function unit may be performed by VCIBs 41 and 42.

(5) In the above-described embodiment, brake systems 321 and 322 and vehicle fixation systems 341 and 342 directly exchange information such as the vehicle speed. However, the present disclosure is not limited thereto. Brake systems 321 and 322 and vehicle fixation systems 341 and 342 may exchange information via VCIBs 41 and 42.

(6) The above-described embodiment can be considered as disclosure of a device such as vehicle 1, ADK 10, ADS 11, VP 20, base vehicle 30 or VCIBs 41 and 42, or can be considered as disclosure of a control method or a control program in the device.

SUMMARY (1) As shown in FIGS. 1 and 2, VP 20 is a VP to and from which ADK 10 that gives an instruction for autonomous driving is attachable and detachable, the VP being configured to be capable of autonomous driving. As shown in FIGS. 1 and 2, VP 20 includes: base vehicle 30; a first vehicle speed specifying function unit and a second vehicle speed specifying function unit (e.g., brake systems 321 and 322) each specifying a vehicle speed of base vehicle 30; a first vehicle fixing function unit and a second vehicle fixing function unit (e.g., vehicle fixation systems 341 and 342) each carrying out fixation control for fixing base vehicle 30; VCIB 41 that relays control communication of ADK 10 with the first vehicle speed specifying function unit and the first vehicle fixing function unit via a first path (e.g., a path including communication bus 43); and VCIB 42 that relays control communication of ADK 10 with the second vehicle speed specifying function unit and the second vehicle fixing function unit via a second path (e.g., a path including communication bus 44).

As shown in FIG. 4, at the time of occurrence of a one-system failure that makes communication or control via the first path or the second path impossible, each of VCIBs 41 and 42 carries out limp home traveling control including deceleration in accordance with an instruction from ADK 10 (e.g., step S411 and step S414). As shown in FIG. 5, at the time of occurrence of a two-system failure that makes communication or control via the first path and the second path impossible, in a case where the vehicle speed can be obtained from one of the first vehicle speed specifying function unit and the second vehicle speed specifying function unit, an activatable one of the first vehicle fixing function unit and the second vehicle fixing function unit carries out the fixation control, when the vehicle speed becomes zero (e.g., step S361, step S365, step S366, and step S371), and in a case where the vehicle speed cannot be obtained from any of the first vehicle speed specifying function unit and the second vehicle speed specifying function unit, the activatable one of the first vehicle fixing function unit and the second vehicle fixing function unit carries out the fixation control after a lapse of a first prescribed time period (e.g., prescribed time period S described in the modification) from a time-counting start moment, when the vehicle speed immediately before the occurrence of the two-system failure is less than a prescribed value (e.g., step S361, step S365, step S367, and step S371. In FIG. 5, prescribed time period S=0.), and carries out the fixation control after a lapse of a second prescribed time period (e.g., prescribed time period T) from the time-counting start moment, when the vehicle speed immediately before the occurrence of the two-system failure exceeds the prescribed value (e.g., step S361, step S365, step S367, and step S368), the second prescribed time period being longer than the first prescribed time period (T>S).

Thus, even in the case where the two-system failure occurs and the vehicle speed cannot be obtained, the fixation control for fixing base vehicle 30 is carried out after the lapse of the first prescribed time period from the time-counting start moment, when the vehicle speed immediately before the occurrence of the two-system failure is less than the prescribed value, and the fixation control is carried out after the lapse of the second prescribed time period from the time-counting start moment, when the vehicle speed immediately before the occurrence of the two-system failure exceeds the prescribed value, the second prescribed time period being longer than the first prescribed time period. As a result, even when a communication path between ADK 10 and VP 20 fails, appropriate fallback control can be carried.

(2) As shown in FIG. 5, at the time of the occurrence of the two-system failure, the activatable one of the first vehicle fixing function unit and the second vehicle fixing function unit may carry out the fixation control, when communication with ADK 10 is possible and an instruction for the fixation control is received from ADK 10 (e.g., step S361, step S363 and step S364).

Thus, when the instruction for the fixation control can be received from ADK 10, the instruction from ADK 10 is followed, and thus, control can be carried out in accordance with an intention of ADK 10 (or a manufacturer of ADK 10).

(3) As shown in FIG. 3, VP 20 may further include: high-voltage battery 61 that stores electric power for travel used for travel of base vehicle 30; 12 V main power supply 64 that is charged with electric power of high-voltage battery 61 after a high voltage of the electric power of high-voltage battery 61 is stepped down, and supplies electric power to the first vehicle speed specifying function unit, the first vehicle fixing function unit and main VCIB 41; and 12 V sub power supply 66 that is charged with electric power from 12 V main power supply 64 and supplies electric power to the second vehicle speed specifying function unit, the second vehicle fixing function unit and sub VCIB 42. As shown in FIG. 5, the time-counting start moment may be a moment at which the one-system failure occurs and power supply from 12 V main power supply 64 fails (e.g., step S351 to step S353).

Thus, when the power supply from 12 V main power supply 64 fails, the electric power is no longer supplied to 12 V sub power supply 66. Therefore, when the electric power of 12 V sub power supply 66 is consumed, not only the first vehicle speed specifying function unit, the first vehicle fixing function unit and main VCIB 41 but also the second vehicle speed specifying function unit, the second vehicle fixing function unit and sub VCIB 42 cannot be operated. Thus, the moment at which the one-system failure occurs and the power supply from 12 V main power supply 64 fails is set as the time-counting start moment for counting a time period that elapses until the fixation control is carried out, whereby the fixation control can be carried out at appropriate timing.

(4) As shown in FIG. 4, at the time of the occurrence of the two-system failure, each of the first vehicle fixing function unit and the second vehicle fixing function unit may carry out emergency stop control (e.g., step S313 and step S316).

Thus, at the time of the occurrence of the two-system failure, emergency stop of base vehicle 30 can be appropriately carried out.

Although the embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A vehicle platform to and from which an autonomous driving kit that gives an instruction for autonomous driving is attachable and detachable, the vehicle platform being configured to be capable of autonomous driving, the vehicle platform comprising:

a base vehicle;

a first vehicle speed specifying function unit and a second vehicle speed specifying function unit each specifying a vehicle speed of the base vehicle;

a first vehicle fixing function unit and a second vehicle fixing function unit each carrying out fixation control for fixing the base vehicle;

a first vehicle control interface box that relays control communication of the autonomous driving kit with the first vehicle speed specifying function unit and the first vehicle fixing function unit via a first path; and a second vehicle control interface box that relays control communication of the autonomous driving kit with the second vehicle speed specifying function unit and the second vehicle fixing function unit via a second path, wherein at the time of occurrence of a one-system failure that makes communication or control via the first path or the second path impossible, each of the first vehicle control interface box and the second vehicle control interface box carries out limp home traveling control including deceleration in accordance with an instruction from the autonomous driving kit, at the time of occurrence of a two-system failure that makes communication or control via the first path and the second path impossible, in a case where the vehicle speed can be obtained from one of the first vehicle speed specifying function unit and the second vehicle speed specifying function unit, an activatable one of the first vehicle fixing function unit and the second vehicle fixing function unit carries out the fixation control, when the vehicle speed becomes zero, and in a case where the vehicle speed cannot be obtained from any of the first vehicle speed specifying function unit and the second vehicle speed specifying function unit, the activatable one of the first vehicle fixing function unit and the second vehicle fixing function unit carries out the fixation control after a lapse of a first prescribed time period from a time-counting start moment, when the vehicle speed immediately before the occurrence of the two-system failure is less than a prescribed value, and carries out the fixation control after a lapse of a second prescribed time period from the time-counting start moment, when the vehicle speed immediately before the occurrence of the two-system failure exceeds the prescribed value, the second prescribed time period being longer than the first prescribed time period.

2. The vehicle platform according to claim 1, wherein at the time of the occurrence of the two-system failure, the activatable one of the first vehicle fixing function unit and the second vehicle fixing function unit carries out the fixation control, when communication with the autonomous driving kit is possible and an instruction for the fixation control is received from the autonomous driving kit.

3. The vehicle platform according to claim 1, further comprising:

a high-voltage power storage device that stores electric power for travel used for travel of the base vehicle;

a first low-voltage power storage device that is charged with electric power of the high-voltage power storage device after a high voltage of the electric power of the high-voltage power storage device is stepped down, and supplies electric power to the first vehicle speed specifying function unit, the first vehicle fixing function unit and the first vehicle control interface box; and a second low-voltage power storage device that is charged with electric power from the first low-voltage power storage device and supplies electric power to the second vehicle speed specifying function unit, the second vehicle fixing function unit and the second vehicle control interface box, wherein the time-counting start moment is a moment at which the one-system failure occurs and power supply from the first low-voltage power storage device fails.

4. The vehicle platform according to claim 1, wherein at the time of the occurrence of the two-system failure, each of the first vehicle fixing function unit and the second vehicle fixing function unit carries out emergency stop control.

5. A method for controlling a vehicle platform to and from which an autonomous driving kit that gives an instruction for autonomous driving is attachable and detachable, the vehicle platform being configured to be capable of autonomous driving, the vehicle platform including:

a base vehicle;

a first vehicle speed specifying function unit and a second vehicle speed specifying function unit each specifying a vehicle speed of the base vehicle;

a first vehicle fixing function unit and a second vehicle fixing function unit each carrying out fixation control for fixing the base vehicle;

a first vehicle control interface box that relays control communication of the autonomous driving kit with the first vehicle speed specifying function unit and the first vehicle fixing function unit via a first path; and a second vehicle control interface box that relays control communication of the autonomous driving kit with the second vehicle speed specifying function unit and the second vehicle fixing function unit via a second path, the method comprising:

at the time of occurrence of a one-system failure that makes communication or control via the first path or the second path impossible, carrying out, by each of the first vehicle control interface box and the second vehicle control interface box, limp home traveling control including deceleration in accordance with an instruction from the autonomous driving kit;

at the time of occurrence of a two-system failure that makes communication or control via the first path and the second path impossible, in a case where the vehicle speed can be obtained from one of the first vehicle speed specifying function unit and the second vehicle speed specifying function unit, carrying out, by an activatable one of the first vehicle fixing function unit and the second vehicle fixing function unit, the fixation control, when the vehicle speed becomes zero; and in a case where the vehicle speed cannot be obtained from any of the first vehicle speed specifying function unit and the second vehicle speed specifying function unit, carrying out, by the activatable one of the first vehicle fixing function unit and the second vehicle fixing function unit, the fixation control after a lapse of a first prescribed time period from a time-counting start moment, when the vehicle speed immediately before the occurrence of the two-system failure is less than a prescribed value, and carrying out, by the activatable one of the first vehicle fixing function unit and the second vehicle fixing function unit, the fixation control after a lapse of a second prescribed time period from the time-counting start moment, when the vehicle speed immediately before the occurrence of the two-system failure exceeds the prescribed value, the second prescribed time period being longer than the first prescribed time period.

* * * * *